United States Patent
Kong et al.

(10) Patent No.: US 9,033,257 B2
(45) Date of Patent: May 19, 2015

(54) APPARATUS FOR SUPPLYING WASHER LIQUID OF VEHICLE

(71) Applicant: Hyundai Motor Company, Seoul (KR)

(72) Inventors: Nak Kyoung Kong, Gyeonggi-do (KR);
Bock Cheol Lee, Gyeonggi-do (KR); Jin Hee Lee, Seoul (KR); Hyun Sub Kim, Seoul (KR); Young Sub Oh, Gyeonggi-do (KR); Dae Hwan Kim, Daejeon (KR)

(73) Assignee: Hyundai Motor Company, Seoul (KR)

( * ) Notice: Subject to any disclaimer, the term of this patent is extended or adjusted under 35 U.S.C. 154(b) by 46 days.

(21) Appl. No.: 13/914,955

(22) Filed: Jun. 11, 2013

(65) Prior Publication Data

US 2014/0166780 A1    Jun. 19, 2014

(30) Foreign Application Priority Data

Dec. 18, 2012 (KR) .......................... 10-2012-0148057

(51) Int. Cl.
*B60S 1/34* (2006.01)
*B60S 1/52* (2006.01)

(52) U.S. Cl.
CPC .............. *B60S 1/3443* (2013.01); *B60S 1/524* (2013.01)

(58) Field of Classification Search
CPC .......... B60S 1/3415; B60S 1/48; B60S 1/482; B60S 1/52; B60S 1/522; B05B 1/10

USPC ................. 239/284.1, 284.2, 289; 15/201.01, 15/250.04–250.07; 134/6, 42
See application file for complete search history.

(56) References Cited

U.S. PATENT DOCUMENTS

| | | | | |
|---|---|---|---|---|
| 3,230,564 A | * | 1/1966 | McDevitt .................... | 15/250.04 |
| 3,887,956 A | * | 6/1975 | Wind .......................... | 15/250.04 |
| 5,195,206 A | * | 3/1993 | Bauer et al. ................. | 15/250.1 |
| 5,327,614 A | * | 7/1994 | Egner-Walter et al. .... | 15/250.04 |
| 5,454,134 A | * | 10/1995 | Edele et al. ................. | 15/250.04 |
| 5,561,882 A | * | 10/1996 | Eustache et al. ........... | 15/250.001 |
| 5,711,487 A | * | 1/1998 | Hommelet .................. | 239/284.1 |
| 5,819,360 A | * | 10/1998 | Fujii ............................ | 15/250.04 |
| 7,793,381 B2 | * | 9/2010 | Yon ............................. | 15/250.04 |
| 8,225,455 B1 | * | 7/2012 | Blus et al. ................... | 15/250.01 |
| 8,621,705 B1 | * | 1/2014 | Valeanu ...................... | 15/250.04 |
| 2012/0005855 A1 | * | 1/2012 | Egner-Walter et al. .... | 15/250.01 |

FOREIGN PATENT DOCUMENTS

| | | |
|---|---|---|
| JP | 2012106679 A | 6/2012 |
| KR | 20-0188912 Y1 | 5/2000 |
| KR | 10-2006-0116315 | 11/2006 |
| KR | 10-2007-0112602 | 11/2007 |

\* cited by examiner

*Primary Examiner* — Darren W Gorman
(74) *Attorney, Agent, or Firm* — Mintz Levin Cohn Ferris Glovsky and Popeo, P.C.; Peter F. Corless

(57) ABSTRACT

An apparatus that supplies washer liquid of a vehicle, in which a washer liquid hose is inserted into a lower end of a pivot shaft by applying a check valve to the lower end of the pivot shaft. In addition, the washer liquid hose is inserted into the pivot shaft and a pipe, to secure a hose route during wiper operation.

2 Claims, 3 Drawing Sheets

APPARATUS FOR SUPPLYING WASHER LIQUID OF VEHICLE

CROSS-REFERENCE TO RELATED APPLICATION

This application claims under 35 U.S.C. §119(a) the benefit of Korean Patent Application No. 10-2012-0148057 filed Dec. 18, 2012, the entire contents of which are incorporated herein by reference.

BACKGROUND (a) Technical Field

The present invention relates to an apparatus that supplies washer liquid of a vehicle which can substantially smoothly supply the washer liquid.

(b) Background Art

In general, a wiper is mounted at the exterior of a front windshield or rear window of a vehicle and is generally made of glass. The wiper is used to remove rainwater or foreign matters remaining on the glass to secure a driver's field of vision during wet weather conditions. When foreign matters are stuck to the surface of the front windshield or rear window, washer liquid is sprayed onto the glass, and the wiper is operated to remove the foreign matters off the windshield.

FIG. 1 is an exemplary view showing an apparatus for supplying washer liquid according to a related art. The apparatus includes a washer liquid storage tank mounted within a hood, a washer liquid pump 1 configured to pump and transfer washer liquid stored in the washer liquid storage tank, a washer liquid hose 2 through which the pumped washer liquid is transferred to a front windshield or rear window, and a spray nozzle 3 mounted to a wiper blade 5 and configured to spray the washer liquid transferred from the washer liquid hose 2 onto the glass.

The washer liquid hose 2 is branched from the washer liquid pump 1 to lower end portions of driver seat and passenger seat wiper arms 4. The branched hose 2 is connected to the spray nozzle 3 of the wiper blade 5 through the wiper arms 4.

When a driver operates a washer liquid supply switch, the washer liquid is pumped by the washer liquid pump 1 and then supplied to the spray nozzle 3 through the washer liquid hose 2 to be sprayed onto the windshield. When the driver releases the operation of the washer liquid supply switch, the washer liquid transferred to the spray nozzle 3 through the washer liquid hose 2 flows back toward the storage tank when the washer liquid pump 1 is stopped.

However, when the washer liquid flows from the spray nozzle 3 back toward the storage tank, air is filled in the washer liquid hose 2. Subsequently, when the washer liquid is re-supplied through the re-operation of the wiper, the washer liquid is not smoothly supplied due to the air filled in the washer liquid hose 2. When a check valve is separately provided, for example, when the check valve is applied to the spray nozzle, the size of the spray nozzle increases, and it may be difficult to implement the spray nozzle. When the check valve is applied to the washer liquid hose, it may difficult to perform the wiper operation.

Further, since the washer liquid hose 2 is exposed to the exterior of a hood panel, the washer liquid hose 2 decreases the aesthetics of the vehicle, and therefore, the quality of a product may be degraded. When the wiper is operated, the washer liquid hose 2 is interrupted by a wire motor 6 and a pipe 7, which are disposed near the wiper, when moving to the left and right sides, and therefore, it may be difficult to secure a hose route.

SUMMARY

The present invention provides an apparatus that supplies washer liquid of a vehicle, in which a washer liquid hose may be inserted into a lower end of a pivot shaft by applying a check valve to the lower end of the pivot shaft, to facilitate installation and to improve workability, and the washer liquid hose may be inserted into the pivot shaft and a pipe, to increase the aesthetics of the washer liquid hose on the exterior, and a hose route may be secured.

In one aspect, the present invention provides an apparatus that supplies washer liquid of a vehicle, and may include: a washer liquid storage tank; a pivot shaft rotatably supporting a wiper arm; a spray nozzle mounted to a wiper blade to spray washer liquid; a washer liquid hose through which the washer liquid is transferred from the washer liquid storage tank to the spray nozzle by connecting a driver seat pivot shaft, a passenger seat pivot shaft and the spray nozzle; and a check valve mounted at a lower end of the pivot shaft to prevent the washer liquid from flowing back toward the storage tank when the pumping of the washer liquid is stopped, thereby substantially smoothly supplying the washer liquid.

In an exemplary embodiment, the washer liquid hose may be mounted inside a pipe that connects between the driver seat pivot shaft and the passenger seat pivot shaft, to secure a route of the washer liquid hose and to avoid interference between the washer liquid hose and an exterior part.

In another exemplary embodiment, the washer liquid hose may include a first hose that connects between the washer liquid storage tank and the check valve; a second hose connected to the first hose, and penetrated and inserted into the pipe that connects between the driver seat pivot shaft and the passenger seat pivot shaft; and third and fourth hoses connected to the second hose, and respectively connect between the driver seat pivot shaft and the spray nozzle and between the passenger seat pivot shaft and the spray nozzle.

In still another exemplary embodiment, each of the driver seat pivot shaft and the passenger seat pivot shaft may have a first flow path and a second flow path thereinside, and the washer liquid may be transferred to the washer liquid hose through the first and second flow paths.

Advantages of the apparatus for supplying washer liquid of a vehicle are described as follows.

First, when the check valve is fixed by being inserted into the lower end of the pivot shaft, and the washer liquid supply switch is operated, the washer liquid may be supplied to the spray nozzle via the check valve through the washer liquid hose. When the supply of the washer liquid is stopped, the washer liquid may be prevented from flowing toward the storage tank from the spray nozzle by the check valve, so that the substantially smooth supply of the washer liquid may be maintained.

Second, the check valve may be fixed by being inserted into the lower end of the pivot shaft, and assembling ease may increase. Accordingly, when the check valve is applied to the existing spray nozzle, that size of the parts may decrease.

Third, the washer liquid hose may be mounted inside the pipe, thus avoiding interference between a wiper motor and a linkage in the operation of the wiper blade. Since the pivot shaft and the pipe may be used as the route of the washer liquid hose, the washer liquid hose is not exposed to the exterior. Thus, improving the aesthetics of the washer liquid hose.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
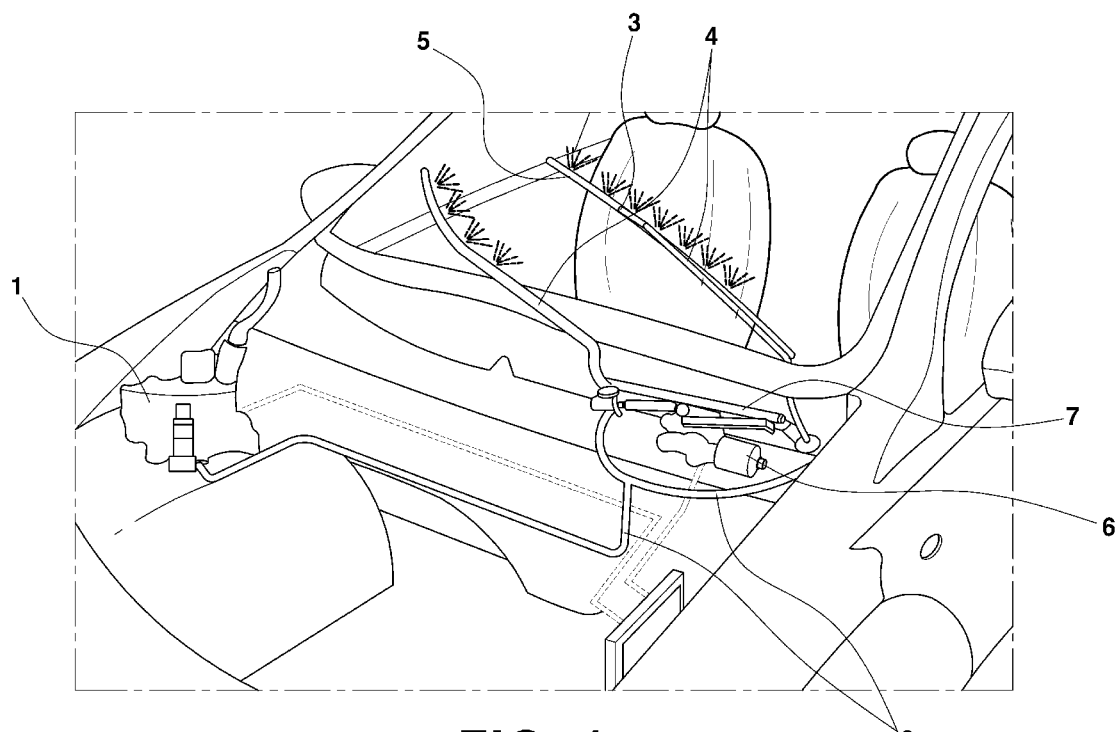
FIG. 1 is an exemplary schematic view showing an apparatus for supplying washer liquid according to a related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
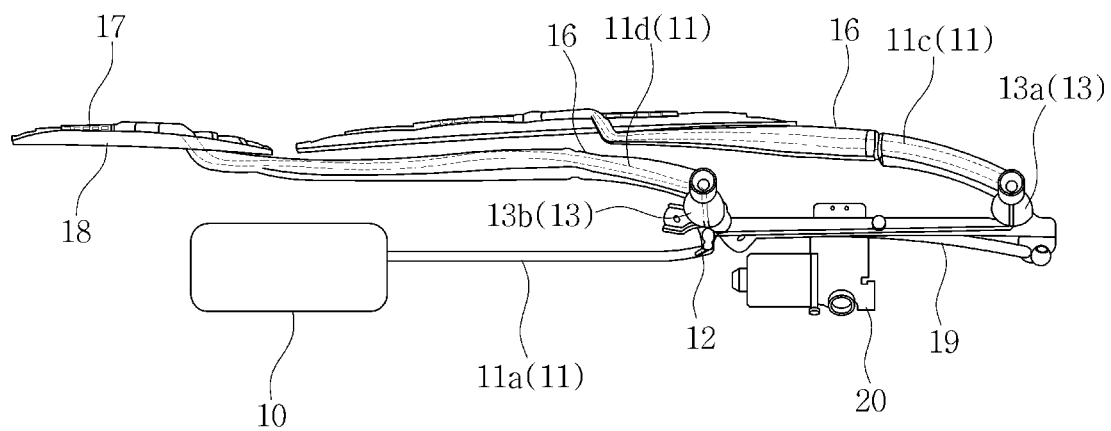
FIG. 2 is an exemplary schematic view showing an apparatus for supplying washer liquid according to an exemplary embodiment of the present invention.
Figure 3:
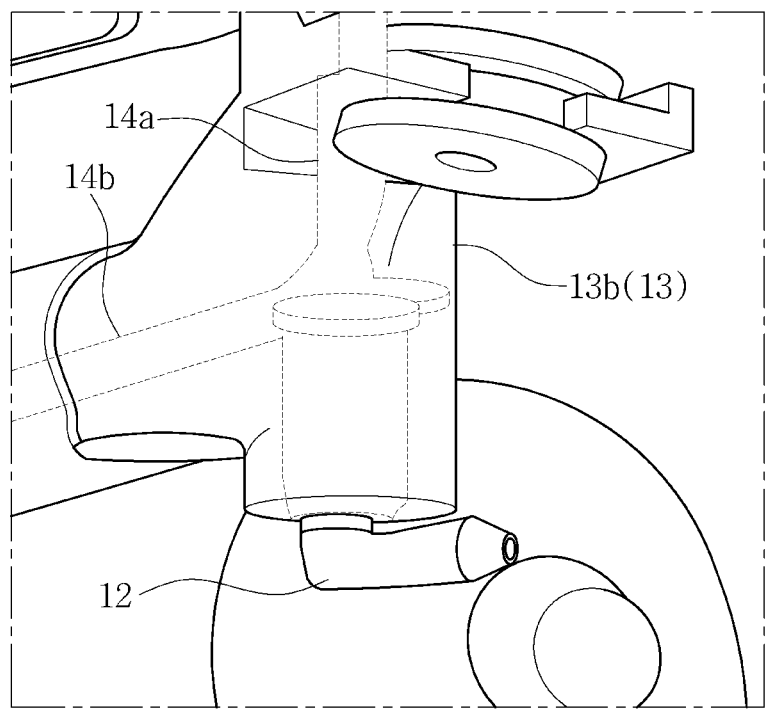
FIG. 3 is an exemplary detailed view of FIG. 2 according to an exemplary embodiment of the present invention.
Figure 4:
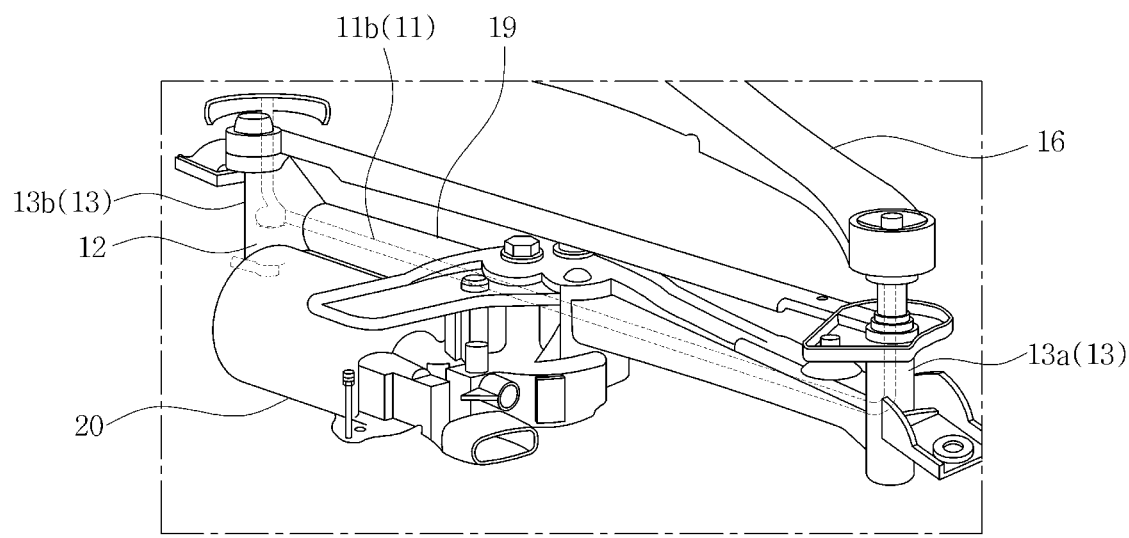
FIG. 4 is an exemplary detailed view of a check valve of FIG. 2 according to an exemplary embodiment of the present invention.
Figure 5:
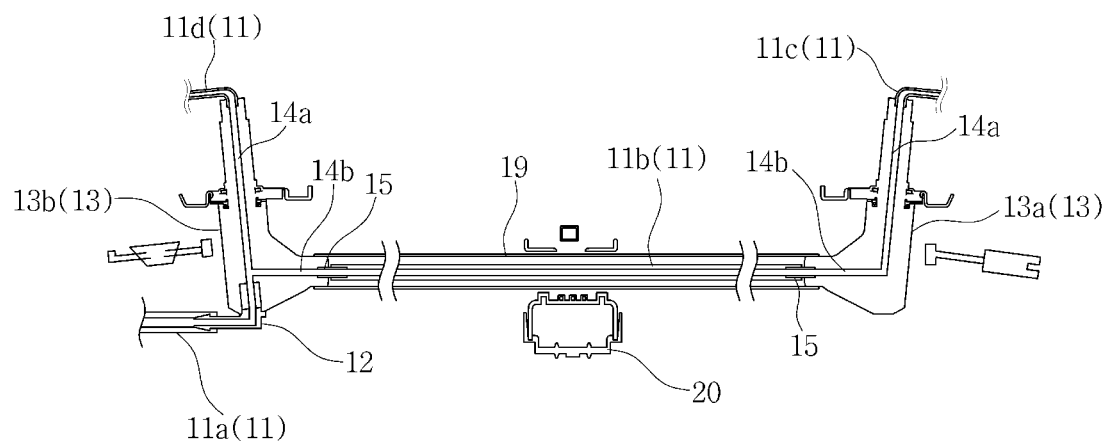
FIG. 5 is an exemplary sectional view of FIG. 3 according to an exemplary embodiment of the present invention.

FIG. 2 is an exemplary schematic view showing an apparatus that supplies washer liquid according to the present invention. FIG. 3 is an exemplary detailed view of FIG. 2. FIG. 4 is an exemplary detailed view of a check valve of FIG. 2. FIG. 5 is an exemplary sectional view of FIG. 3.

The present invention provides an apparatus that supplies washer liquid of a vehicle, in which a check valve 12 may be mounted to a pivot shaft 13, to increase workability and secure the route of a washer liquid hose 11. The apparatus according to the present invention may include a washer liquid storage tank 10, a washer liquid hose 11, a check valve 12 and a spray nozzle 18. The washer liquid storage tank 10 may be configured similarly to the washer liquid storage tank and washer liquid hose of the related art, and therefore, its detailed description will be omitted.

The washer liquid hose 11 may include a first hose 11a through which the washer liquid storage tank 10 is connected to the check valve 12, a second hose 11b connected to the first hose 11a and penetrated into a pipe 19, a third hose 11c through which a driver seat pivot shaft 13a is connected to the spray nozzle 18, and a fourth hose 11d through which a passenger seat pivot shaft 13b is connected to the spray nozzle 18. The washer liquid hose 11 may be configured to transfer washer liquid stored in the washer liquid storage tank 10 to the check valve 12, the pivot shaft 13, a wiper arm 16 and the spray nozzle 18.

The check valve 12 may be formed into the structure of an elbow shaped tube (e.g., L-shaped), and an aperture through which the washer liquid may flow may be formed inside the tube. A spring and a ball shaped check ball may be mounted inside the tube to prevent the washer liquid from flowing back toward the storage tank 10.

A lower end portion of the check valve 12 may be connected to the first hose 11a, and an upper end portion of the check valve 12 may be inserted and coupled to a lower end of the pivot shaft 13. The check valve 12 may be configured to transfer the washer liquid from the first hose 11a to the pivot shaft 13 while preventing the washer liquid from being transferred in the opposite direction to the transferring direction (e.g., from flowing back toward the storage tank 10). Accordingly, the check valve 12 may be configured to prevent the washer liquid from flowing back through the washer liquid hose 11 in the re-operation of a wiper after the operation of the wiper is stopped, thereby substantially smoothly supplying the washer liquid.

The pivot shaft 13 is a part that may rotatably support the wiper arm 16. The driver seat pivot shafts 13a and the passenger seat pivot shaft 13b may be respectively disposed at a driver seat and a passenger seat while being spaced apart from each other at an interval. The driver seat pivot shafts 13a and the passenger seat pivot shaft 13b may be connected by the pipe 19 disposed in the lateral direction from the lower end of the pivot shaft 13.

An upper end portion of the pivot shaft 13 may be connected to the third hose 11c at the driver seat or the fourth hose 11d at the passenger seat. An insertion groove may be formed at an upper end of the pivot shaft 13 to fix the hose 11 by inserting the hose 11 into the insertion groove or into a connector 15.

In the pivot shaft 13, a lower end portion of the passenger seat pivot shaft 13b may be connected to the first hose 11a through the check valve 12, and a lower end portion of the driver seat pivot shaft 13a may be clogged. Side end portions protruded in the lateral direction while being adjacent to the lower end of the pivot shaft 13 may be connected by the pipe 19. The pivot shaft 13 may have a first flow path 14a and a second flow path 14b as a washer liquid passageway. The first flow path 14a may be formed in the axis direction inside the pivot shaft 13, and the second flow path 14b may be formed in the lateral direction from the first flow path 14a. In the passenger seat pivot shaft 13b. the first flow path 14a may connect the check valve 12 and the fourth hose 11d. and the second flow path 14b may connect the first flow path 14a and one end portion of the second hose 11b. to forming a connection passageway. In the driver seat pivot shaft 13a. the second flow path 14b may connect the other end portion of the second hose 11b and the first flow path 14a. and the first flow path 14a may connect the second flow path 14b and the third hose 11c to form a connection passageway.

The third and fourth hoses 11c and 11d may be mounted inside the wiper arm 16 to transfer the washer liquid to the spray nozzle 18 from the driver seat pivot shaft 13a and the passenger seat pivot shaft 13b.

The assembling method of the second hose 11b will be described. First, a first end portion of the second hose 11b may be connected to a lower side end portion of the passenger seat pivot shaft 13b by the connector 15, and the second hose 11b may pass through the inside of the pipe 19. Then, a second end portion of the second hose 11b may be connected to a lower side end portion of the driver seat pivot shaft 13a. Subsequently, the first and second end portions of the pipe 19 may be connected to the lower side end portion of the pivot shaft 13.

Thus, according to the present invention, when the check valve 12 is fixed by being inserted into the lower end of the pivot shaft 13, and the washer liquid supply switch is operated, the washer liquid may be supplied to the spray nozzle 18 via the check valve 12 through the washer liquid hose 11. When the supply of the washer liquid is stopped, the washer liquid may be prevented from flowing back toward the storage tank 10 from the spray nozzle 18 by the check valve 12, thus maintaining the substantially smooth supply of the washer liquid.

Further, the check valve 12 may be fixed by being inserted into the lower end of the pivot shaft 13, thus increase ease of assembling. Accordingly, when the check valve 12 is applied to the existing spray nozzle, the size of the parts may be decreased. In addition, the washer liquid hose 11 may be mounted inside the pipe 19, to avoid interference between a wiper motor 20 and a linkage during the operation of the wiper blade 17. Since the pivot shaft 13 and the pipe 19 are used as the route of the washer liquid hose 11, the washer liquid hose 11 may not be exposed to the exterior, thus enhancing the aesthetics of the washer liquid hose 11.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. An apparatus that supplies washer liquid of a vehicle, comprising:
   a washer liquid storage tank;
   pivot shafts rotatably supporting wiper arms, respectively, and including a driver seat side pivot shaft and a passenger seat side pivot shaft, in which flow paths are formed, respectively;
   spray nozzles mounted to wiper blades provided at a driver seat side wiper arm and a passenger seat side wiper arm, respectively, to spray washer liquid;
   a washer liquid hose including multiple hose portions arranged for transferring the washer liquid from the washer liquid storage tank to the spray nozzles of the wiper arms via the pivot shafts; and
   a check valve mounted at a lower end of the passenger seat side pivot shaft to prevent the washer liquid from flowing back toward the washer liquid storage tank,
   wherein one of the hose portions is provided between the driver seat side pivot shaft and the passenger seat side pivot shaft, and is mounted inside a pipe for connecting the flow paths of the driver seat side pivot shaft and the passenger seat side pivot shaft, so as to secure a route for transferring the washer fluid without any interference between the washer liquid hose and any exterior parts.

2. The apparatus of claim 1, wherein the washer liquid hose includes:
   a first hose portion that connects the washer liquid storage tank and the check valve;
   a second hose portion penetrated and inserted into the pipe that connects the driver seat side pivot shaft and the passenger seat side pivot shaft;
   a third hose portion connecting the driver seat side pivot shaft and the spray nozzle in the driver seat side wiper arm blade; and
   a fourth hose portion connecting the passenger seat side pivot shaft and the spray nozzle in the passenger seat side wiper arm blade.

* * * * *